(12) United States Patent
Nishiyama et al.

(10) Patent No.: US 6,320,278 B1
(45) Date of Patent: *Nov. 20, 2001

(54) POWER SUPPLY CIRCUIT

(75) Inventors: Toshihiko Nishiyama; Kouji Sakata; Junko Kurihara; Gaku Harada, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,000

(22) Filed: Jun. 26, 1998

(30) Foreign Application Priority Data

Jun. 30, 1997 (JP) .................................................. 9-173659

(51) Int. Cl.$^7$ ........................................................ H02J 1/10
(52) U.S. Cl. ............................................ 307/53; 307/109
(58) Field of Search ..................................... 307/109, 110, 307/43, 44, 64, 66, 85, 71, 62, 52, 53, 80, 140, 59, 63, 54

(56) References Cited

U.S. PATENT DOCUMENTS

| | | | |
|---|---|---|---|
| 4,677,311 | * | 6/1987 | Morita ..................................... 307/66 |
| 5,437,943 | | 8/1995 | Fujii et al. . |
| 5,439,756 | | 8/1995 | Amamo et al. . |
| 5,532,572 | * | 7/1996 | Okamura ................................. 320/1 |
| 5,587,250 | | 12/1996 | Thomas et al. . |
| 5,604,426 | * | 2/1997 | Okaura et al. ........................ 323/282 |
| 5,734,205 | * | 3/1998 | Okamura et al. ..................... 307/110 |

FOREIGN PATENT DOCUMENTS

| | | |
|---|---|---|
| 0 346 822 A1 | 12/1989 | (EP) . |
| 0 750 359 A2 | 12/1996 | (EP) . |
| 55-133768 | 10/1980 | (JP) . |

(List continued on next page.)

OTHER PUBLICATIONS http://www.phys.ufl.edu/~phy3054/dcircuit/ohm/ohmslaw/page11.html, A single page describing series and parallel connections, undated.* http://enrich.sdsc.edu/SE/Physics/Ohms/. An article entitled "Science Enrichment Program" from the San Diego Supercomputer Center, undated.*

Rudge, A., Davey, J., Raistrick, I. & Gottesfeld, S., "Conducting Polymers as Active Materials in Electrochemical Capacitors," *Journal of Power Sources*, vol. 47, pp. 89–107, Jan. 1, 1994.

Korean Notice of Invitation of Opinion, dated Sep. 29, 2000, with English language translation of Korean Examiner's comments.

Rudge, A., Davey, J., Raistrick, I. & Gottesfeld, S., "Conducting polymers as active materials in electrochemical capacitors," *Journal of Power Sources*, vol. 47, p. 89–107, 1994.

Ott, H., "Noise reduction techniques in electronic systems," *Practical Technology Series*, p. 18–19.

*Primary Examiner*—Fritz Fleming
(74) *Attorney, Agent, or Firm*—Whitham, Curtis & Whitham (57) ABSTRACT

A power supply device of the present invention includes an electric double layer capacitor connected to, e.g., an HDD (Hard Disk Drive), CD-ROM (Compact Disk Read Only Memory) drive, floppy disk drive or similar motor-driven equipment, and another electric double layer capacitor connected to, e.g., a pulse generating device included in a radio transmitter. The capacitors each feed power when the load of the associated equipment sharply varies during operation of the equipment. This makes it needless for a main power supply to feed such power. A laminate polymer battery is connected to a low voltage IC (Integrated Circuit) and feeds power thereto. This also makes it needless for the main power to feed power to the low voltage IC, and allows a short feed line to connect the laminate polymer battery and IC. The short feed line reduces the transfer of noise to the IC and therefore malfunction ascribable to noise.

11 Claims, 7 Drawing Sheets

FOREIGN PATENT DOCUMENTS

| | | |
|---|---|---|
| 55-133772 Sho | 10/1980 | (JP) . |
| 58-193738 | 12/1983 | (JP) . |
| 63-25984 | 2/1988 | (JP) . |
| 63-36319 | 2/1988 | (JP) . |
| Hei 2-49385 | 4/1990 | (JP) . |
| 3-22829 | 1/1991 | (JP) . |
| 3-226029 | 10/1991 | (JP) . |
| Hei 3-130737 | 12/1991 | (JP) . |
| 5-122871 | 5/1993 | (JP) . |
| Hei 5-316646 | 11/1993 | (JP) . |
| 5-328633 | 12/1993 | (JP) . |
| 6-150951 | 5/1994 | (JP) . |
| Hei 7-37604 | 2/1995 | (JP) . |
| Hei 7-57782 | 3/1995 | (JP) . |
| 7-225380 | 8/1995 | (JP) . |
| Hei 7-230809 | 8/1995 | (JP) . |
| 8-37706 * | 2/1996 | (JP) . |
| Hei 8-158995 | 6/1996 | (JP) . |
| Hei 8-185851 | 7/1996 | (JP) . |
| Hei 8-222272 | 8/1996 | (JP) . |
| Hei 8-227708 | 9/1996 | (JP) . |
| 8-265990 | 10/1996 | (JP) . |
| 8-308104 | 11/1996 | (JP) . |
| Hei 8-298137 | 11/1996 | (JP) . |
| Hei 9-36997 | 2/1997 | (JP) . |

* cited by examiner

POWER SUPPLY CIRCUIT

BACKGROUND OF THE INVENTION

The present invention relates to a power supply circuit for electronic equipment and comprising of a main power supply and a plurality of auxiliary power supplies. More particularly, the present invention is concerned with a power supply circuit capable of guaranteeing power when momentary load variation occurs in electronic equipment or when the efficiency of a main power supply noticeably falls.

Various kinds of load variation occur in a personal computer or similar electronic equipment, depending on the operating condition of the equipment. For example, a rapid current load occurs in the event of an access to an HDD (Hard Disk Drive), CD-ROM (Compact Disk Read Only Memory) drive or similar motor-driven equipment. To cope with such a current load exceeding normal one, a power supply circuit must be provided with a capacity capable of dealing with the expected maximum current load. On the other hand, electronic equipment is sometimes driven in a mode needing only a relatively small current. For example, when a stop clock function available with a personal computer is active or when a video tape recorder or a television (TV) receiver is in a stand-by state, power which is only about $\frac{1}{100}$ of the designed maximum capacity of a power supply suffices. The power supply circuit therefore must cope with such a low current load also.

The above conventional power supply circuit has some problems left unsolved in relation to load variation, as follows. The power supply circuit designed to deal with the maximum momentary load current is scaled up and increases the overall size and cost of the equipment. This problem is particularly serious with a portable telephone or similar portable equipment. When the power supply is implemented by a battery, the battery must deal even with the previously stated load variation. This increases a load on the battery and thereby reduces the life of the battery, i.e., the operation time of the equipment powered by the battery.

Another problem is that equipment of the type oscillating pulses causes the voltage of a battery to sharply drop. Specifically, assume that portable equipment powered by a secondary battery having a high internal impedance oscillates great current pulses continuously. Then, the battery reaches its end voltage before the amount of electricity stored therein is used up. As a result, the continuous operation time of the equipment is reduced. This problem will be discussed more specifically later.

A further problem is that when load variation is small for a given power supply capacity, efficient power conversion cannot be effected. Consequently, power far greater than the required current is simply wasted as heat, resulting in an extremely low energy conversion efficiency. Assume that a video tape recorder, for example, has the maximum power supply capacity of 80 W and consumes power of 0.1 W in its stand-by state. Then, power of 9.1 W is wasted as heat because the power supply can be lowered only up to about 10%, obstructing efficient use of energy to a critical degree.

Arranging a plurality of power supplies in a single electronic equipment is taught in, e.g., Japanese Patent Laid-Open Publication Nos. 7-225380 and 3-226029. Generally, when an LCD (Liquid Crystal Display) module is driven by portable equipment, a conventional battery cannot turn on a backlight because of its short capacity. In light of this, the above Laid-Open Publication No. 7-225380 teaches that a solar battery is positioned behind a secondary battery in order to charge the secondary battery with power generated by the solar battery. The secondary battery and solar battery in combination increase the total amount of power and allow the backlight of portable equipment to be turned on. However, such a combination is not directed toward efficient use of energy achievable with the distributed arrangement of a power supply and batteries capable of dealing with load variation. Laid-Open Publication No. 3-226029 proposes a radio pager including a secondary battery in addition to a power supply assigned to a radio section. This secondary battery is used to drive a vibrator, speaker or similar alerting means. With this configuration, it is possible to reduce the deterioration of sensitivity ascribable to noise produced by the alerting means and tending to reach the power supply of the radio section. Such a configuration, however, simply separates a circuit producing noise and a power supply in order to prevent the noise from entering the power supply and is not directed toward the efficient use of energy stated above.

In a power generation system using, e.g., sunrays or wind force, power generated thereby is not constant, but often varies with the elapse of time. Japanese Patent Laid-Open Publication Nos. 3-22829 and 5-328633, for example, each proposes to use a secondary battery or a commercially available power supply in combination with the above power generation system. The proposal, however, simply levels the power variation of the supply side and cannot cope with load variation occurring at the demand side. Japanese Patent Laid-Open Publication No. 6-150951, for example, teaches that a fuel battery and a gas engine for power generation are combined so as to absorb load variation including a sharp increase in load while generating power efficiently. However, the application of this proposal is limited to homes and buildings. It would be difficult to apply a gas turbine to a personal computer or similar electronic equipment, particularly portable electronic equipment, for configuration reasons and because such equipment needs a response time of the order of microsecond to millisecond.

Moreover, the conventional power supply circuit has a noise problem. How noise derived from a circuit or a system should be reduced is one of problems requiring urgent solutions in the design aspect. Today, various kinds of circuits, e.g., circuits for communication and calculation are arranged close to each other and operated in various ways, often interfering with each other. This is aggravated by the current trend toward miniaturization and multifunction arrangement, i.e., dense mounting of circuit devices and low drive voltage; dense mounting increases the probability of interference while low drive voltage reduces the threshold voltage of ICs (Integrated Circuits). The equipment is therefore caused to malfunction even by small noise. Generally, a noise path includes a noise source, a coupling channel transferring noise output from the noise source, and a receptor or circuit responding to the noise, as described in, e.g., Henry W. Ott "Noise Reduction Techniques in Electronic Systems", Second Edition, pp. 18–19. It is a common practice to devise the coupling channel against noise because measures applicable to the noise source and receptor are few. Conductors are the most obvious, but overlooked, constituent that conveys noise to circuitry. A conductor laid in a n environment involving noise picks up the noise and conveys it to another circuitry. Particularly, a feed line extending from a power supply cannot be provided with more than a certain length to a given circuit device because the power supply is located at a particular position within equipment.

Technologies relating to the present invention are also disclosed in, e.g., Japanese Patent Laid-Open Publication Nos. 55-133768, 55-133772, 63-25984, 63-36319, and 8-308104.

SUMMARY OF THE INVENTION

It is therefore an object of the present invention to provide a power supply circuit including a main power supply and a plurality of auxiliary power supplies and capable of enhancing the efficient use of electric energy available with the power supplies in order to promote the small size and light weight configuration of electronic equipment while increasing the continuous operation time of the equipment.

It is another object of the present invention to provide a power supply circuit capable of minimizing the coupling of noise to a circuit device via a feed line to thereby enhance the reliability of electronic equipment while enhancing power saving.

In accordance with the present invention, a power supply circuit for electronic equipment includes a main power supply, and a plurality of distributed auxiliary power supplies for feeding, when a momentary change in load occurs in the electronic equipment, power necessary for the momentary change in load. The auxiliary power supplies each is implemented by either one of an electric double layer capacitor or similar electrochemical capacitor and a secondary battery having one of a positive pole and a negative pole thereof formed of a conductive polymer.

Also, in accordance with the present invention, a power supply circuit for electronic equipment has a main power supply, and a plurality auxiliary power supplies distributed in the vicinity of devices each consuming small power causing the efficiency of said the power supply to noticeably fall. The auxiliary electrodes each is implemented by a secondary battery having one of a positive pole and a negative pole thereof formed of a conductive polymer.

BRIEF DESCRIPTION OF THE DRAWINGS

The above and other objects, features and advantages of the present invention will become apparent from the following detailed description taken with the accompanying drawings in which.

In the figures, identical reference numerals denote identical structural elements.

DESCRIPTION OF THE PREFERRED EMBODIMENTS

Figure 1:
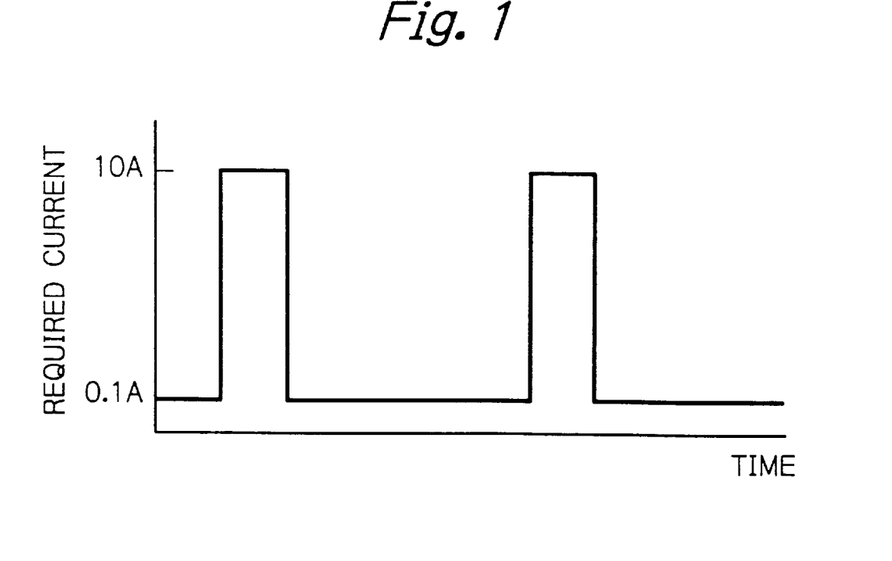
FIG. 1 shows how the drive current of a portable telephone varies between a conversation mode and a stand-by mode.
Figure 2:
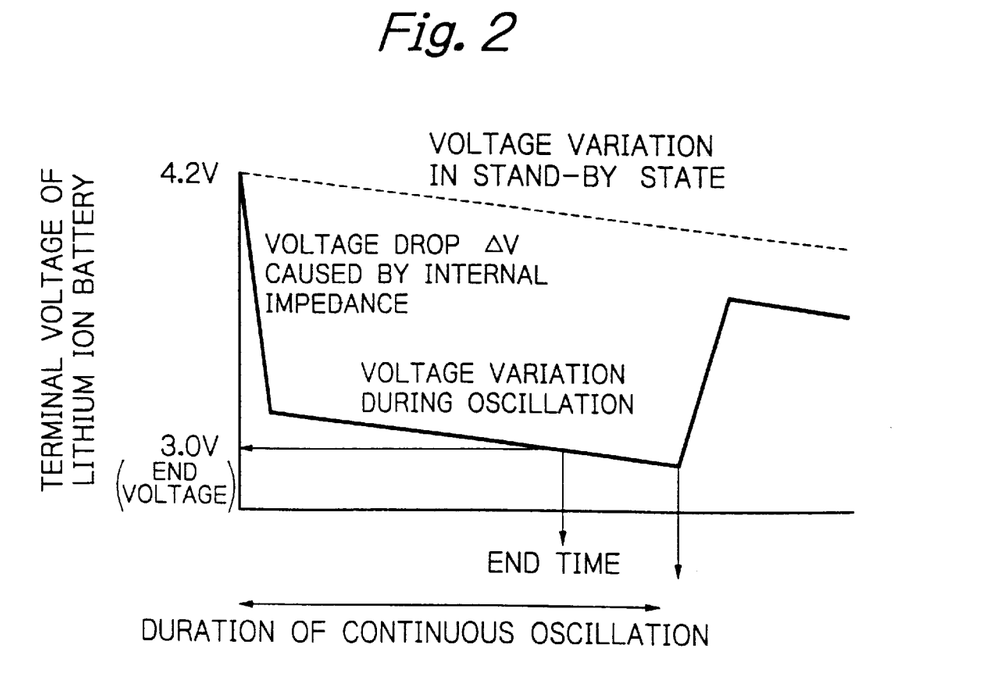
FIG. 2 shows how the terminal voltage of a lithium ion battery varies with the elapse of time.

To better understand the present invention, the sharp voltage drop of a battery ascribable to pulse oscillation mentioned earlier will be discussed specifically with reference to FIGS. 1 and 2. FIG. 1 shows currents which a portable telephone powered by a lithium ion battery or secondary battery consume in its communication mode and stand-by mode. FIG. 2 shows the variation of the terminal voltage of the lithium ion battery occurring with the elapse of time. As shown, at the time of conversation, the electromotive force of the battery sharply drops due to the internal impedance of the battery, i.e., drops by about 1 V (IR drop). This voltage drop $\Delta V$ is expressed as:

$$\Delta V = I \times R$$

where I and R respectively denote a pulse current (A) and the internal impedance of the battery ($\Omega$). In this case, the internal impedance of the battery is about 100 m$\Omega$ while the pulse current at the time of pulse oscillation (conversation) is 10 A as indicated in FIG. 1, so that the voltage drop $\Delta V$ is 1 V (10×0.1=1).

As for a portable telephone oscillating pulses continuously, the battery voltage drops little by little without recovering from the voltage drop $\Delta V$ ascribable to the internal impedance. Generally, a lithium ion battery has an end voltage selected to be about 3.2 V; discharge exceeding the end voltage would irreversibly vary the structure of the positive pole active substance and would thereby critically deteriorate the charge and discharge characteristic of the battery. As shown in FIG. 2, conversation can be continued only to the time when the lithium ion battery reaches the above end voltage (end time). When the oscillation of pulses ends, e.g., when a portable telephone enters its stand-by mode, the current to be consumed, of course, falls to about 0.1 A, as shown in FIG. 1. As a result, the voltage drop $\Delta V$ ascribable to the internal impedance is reduced to about 0.1 V, allowing the battery voltage to be restored to the conversation level. In this manner, when a portable telephone powered by a secondary battery having a high internal impedance continuously oscillates pulses in the form of great currents, the battery reaches its end voltage without having electricity stored therein fully used. This reduces the continuous operation time of the telephone.

Figure 3:
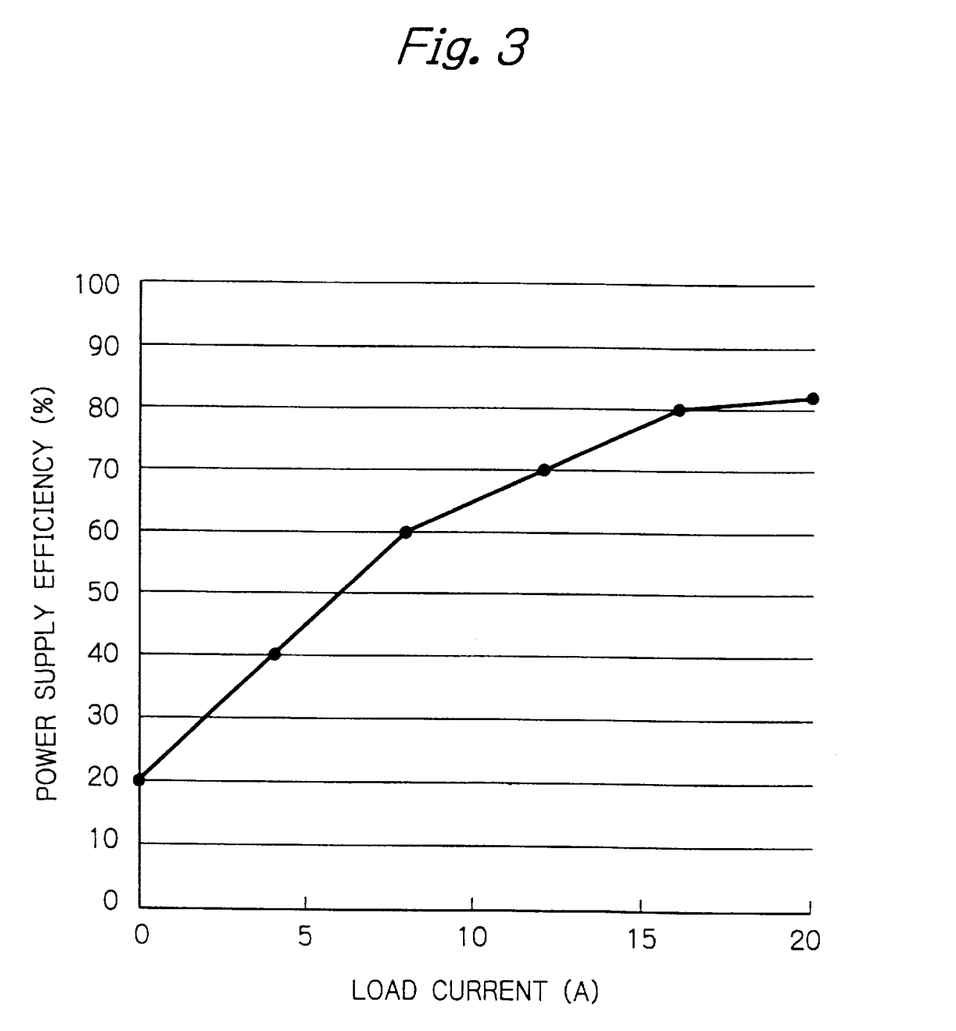
FIG. 3 shows a power supply efficiency available with a switching power supply.
Figure 4:
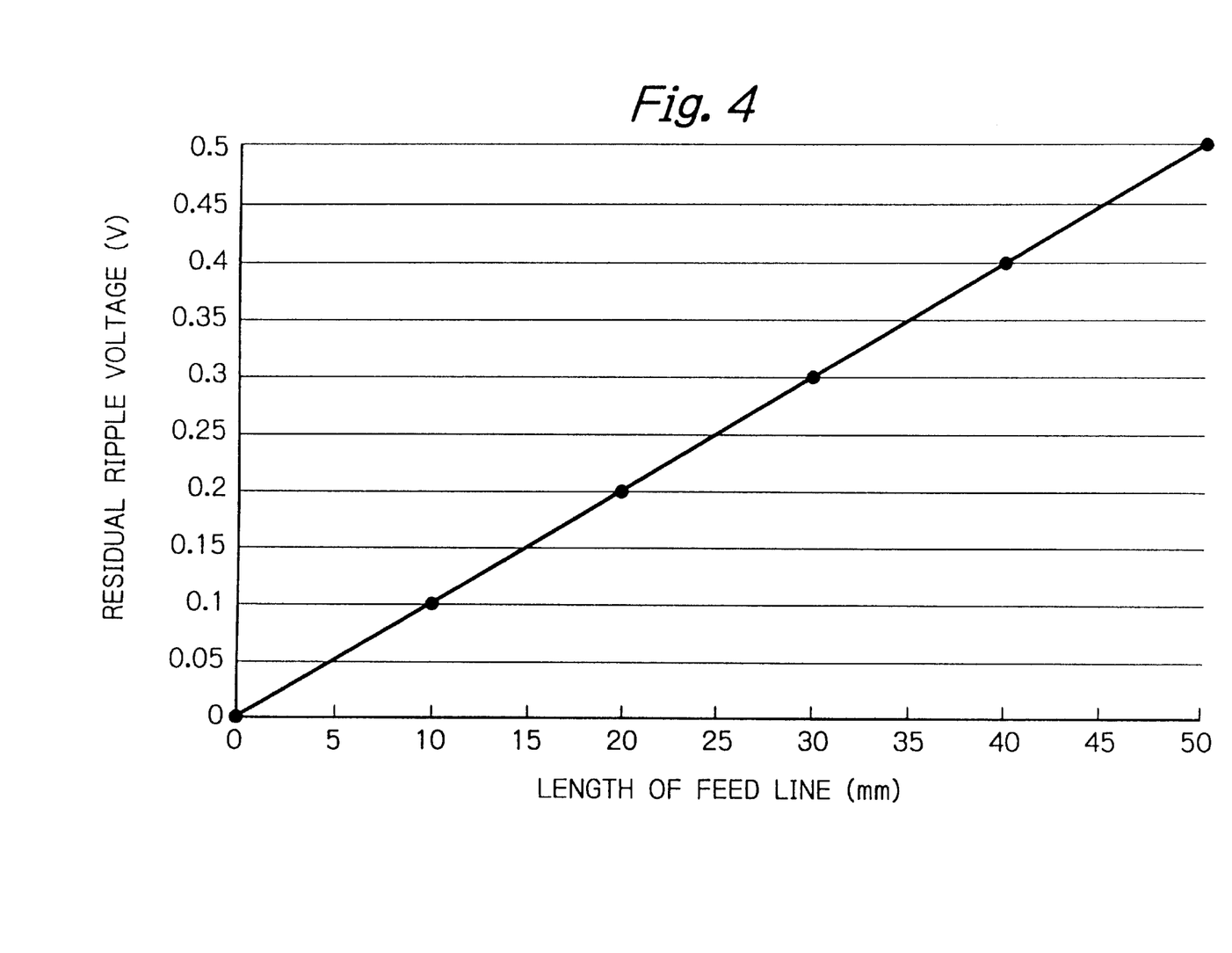
FIG. 4 shows a relation between the length of a feed line and a residual ripple current.

FIG. 3 shows a curve representative of an energy conversion efficiency associated with the load current of a switching (SW) power supply. The curve accounts for the previously stated occurrence that when the load variation is small for a given power supply capacity, power far greater than the required current is simply wasted as heat because efficient capacity conversion cannot be effected. As a result, the energy conversion efficiency is critically lowered. FIG. 4 shows a relation between the length of a feed line and the residual ripple current and addressing to the noise problem discussed earlier.

In accordance with the present invention, a distributed power supply circuit includes an electric double layer capacitor and a laminate polymer battery. The electric double layer capacitor is connected to an HDD, CD-ROM drive, floppy disk drive or similar motor-driven equipment or a pulse generating device included in, e.g., a radio transmitter so as to feed power for implementing a sharp load at the beginning of operation or current pulses to be continuously output. The laminate polymer battery is connected to, e.g, an infrared ray receiving section included in the remote control circuit of a home TV receiver or is located in the vicinity of a DRAM (Dynamic Random Access Memory) or similar low voltage IC, so that power can be fed from the former to the latter via a short feed line.

The electric double layer capacitor has a unit element including two electrodes formed of active carbon and positioned on conductive rubber or similar current collecting body. The two electrodes face each other via an ion permeable film. An electrolytic liquid is implemented by, e.g., dilute sulfuric acid containing sulfuric acid ions or similar electric double layer forming ions. The capacitor uses a charge stored in the electric double layer formed on active carbon and is therefore advantageous in that a charge greater than a charge available with another kind of capacitor, e.g., electrolytic capacitor can be stored (up to several hundreds of farads), in that the number of times of charging and discharging is not limited due to physical charge storage, and in that rapid charging and discharging of the order of nanosecond is achievable. The capacitor is connected in parallel with the main power supply and discharges for a load source while being instantaneously charged by the main power supply.

The laminate polymer battery has a unit element including a positive pole active substance implemented by a conductive polymer and formed on Cu, Al or similar current collecting body, and a negative pole active substance implemented by a conductive polymer formed on Zn or similar metal (except for lithium metal) current collecting body or on a Cu, Al or similar current collecting body. The two conductive polymers face each other via an ion permeable film. For an electrolyte, use is made of an aqueous solution of perchlolate or similar electrolytic liquid, or a polymer solid electrolyte, or a gel. It is to be noted that substances containing lithium ions as a supporting electrolyte are not usable.

A major factor that limits the charge and discharge characteristic of a secondary battery is the irreversible variation of the structure of an electrode substance ascribable to charge and discharge reactions. For example, as for a positive electrode reaction, the charge and discharge of a lithium ion battery proceeds as $LiCoO_2 \rightarrow Li_{1-x}CoO_2 + xLi^+ + xe^-$. The perovskite structure of $LiCoO_2$ is destroyed little by little by the separation and deposition of lithium ions $Li^+$.

In the laminate polymer battery, the reaction of the positive and negative electrodes occurs on the basis of the separation and deposition of a dopant on a conductive polymer or the separation and deposition of protons on the sulfone group of a polymer dopant or a conductive polymer. This kind of battery features a long cycle life (up to one million times), safety due to the absence of lithium or lithium ions, and a simple casing. Further, with such features, the battery can be mounted on a circuit in an on-board configuration and does not have to be replaced. In addition, the battery is thin when use is made of a polymer solid electrolyte or a gel for an electrolyte.

Specific configurations of a secondary battery are taught in, e.g., Journal of Power Sources, 47 (1994), pp. 89–107. The specific configurations each uses a polypyrol, polythiophene, polyanine or derivable thereof as an active substance. Considering the entire power supply circuit, apart from the characteristic required of the individual device, it is necessary to distribute the main power supply and auxiliary power supplies such that each of them provides the associated equipment with the maximum performance.

In accordance with the present invention, electric double layer capacitors each is connected to an HDD, CD-ROM drive, floppy disk drive or similar motor-driven equipment or a pulse generating device included in a radio transmitter. The capacitors each feeds power when the load of the associated equipment sharply varies during operation of the equipment. This makes it needless for a main power supply to feed such power. The laminate polymer battery is connected to a low voltage IC and feeds power thereto. This also makes it needless for the main power supply to feed power to the low voltage IC, and allows a short feed line to connect the laminate polymer battery and IC. The short feed line reduces the propagation of noise to the IC and therefore malfunction ascribable to noise.

Figure 5:
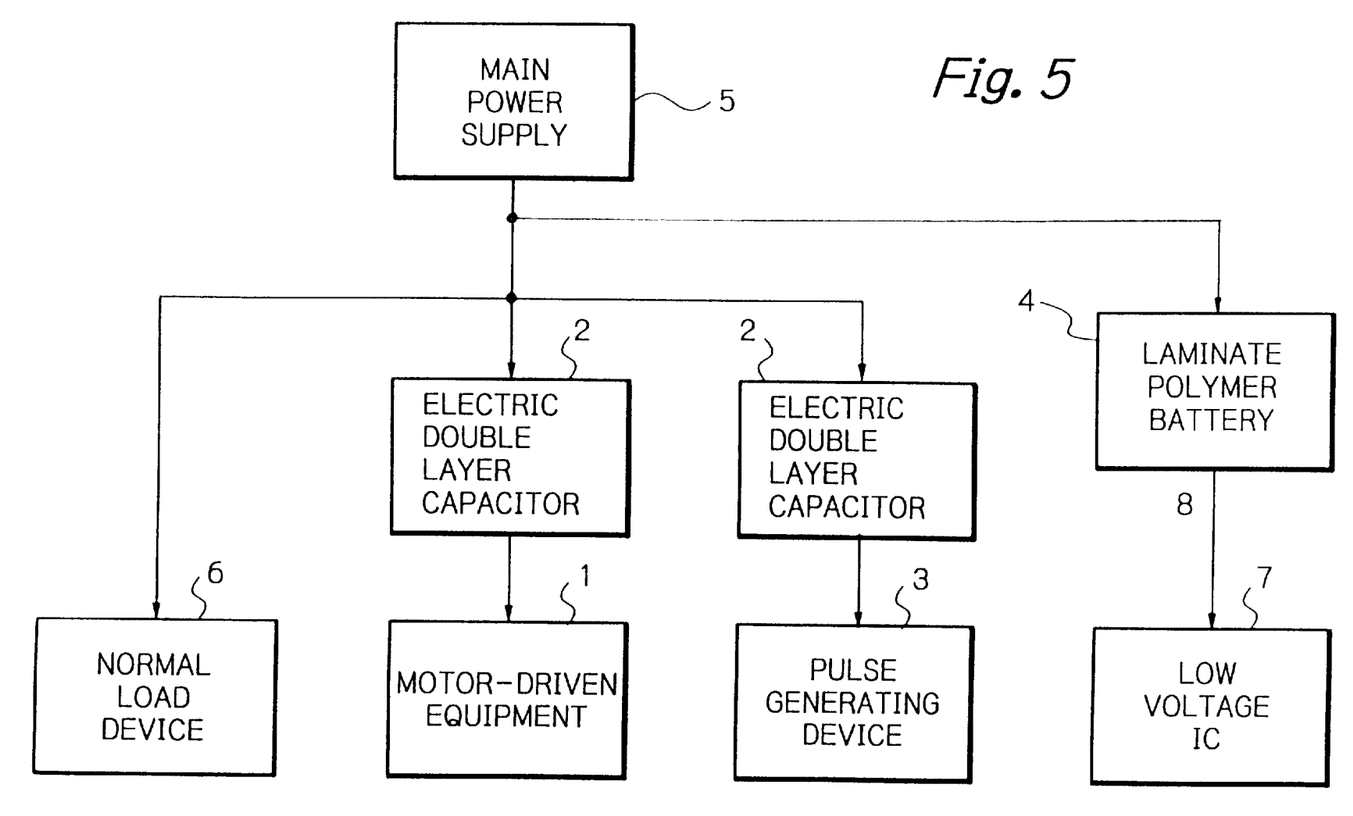
FIG. 5 is a block diagram schematically showing a power supply circuit embodying the present invention.

FIG. 5 shows an HDD or similar motor-driven equipment 1 needing a rapid current load, a continuous pulse current or pulse generating device 3, a normal load device 6, and a low voltage IC 7 needing a load of low level. The low voltage IC 7 may be a display device turning on in a stand-by state or a DRAM by way of example. Electric double layer capacitors 2 are respectively connected to the motor-driven unit 1 and pulse generating device 3. A main power supply 5 is connected to the capacitors 2 in order to charge them, i.e., to replenish charge. A laminate polymer battery 4 is connected to the low voltage IC 7 by a short feed line 8. The main power supply 5 is also connected to the laminate polymer battery 4, although not shown specifically.

The main power supply 5 may be implemented by either one of a lithium battery, nickel-metal hydride battery or similar secondary battery and a DC power supply constantly connected to a commercially available power supply. The laminate polymer battery 4 is implemented as a stack of unit batteries each having its positive or negative pole formed of a conductive polymer in place of lithium metal. With this configuration, the battery 4 generates a desired electromotive force. When the main power supply 5 is a DC power supply connected to a commercially available power supply, the battery 4 will be constantly charged. When use is made of a secondary battery for the main power supply 5, the battery 4 will be recharged at the time of recharging of the secondary battery. It follows that when the main power supply 5 is implemented by a secondary battery, the distributed power supply including both of the main power supply 5 and battery 4 realizes a higher energy density than the main power supply 5 alone. For given total energy, the secondary battery constituting the main power supply 5 can, of course, be reduced in size. On the other hand, when use is made of a secondary battery for the main power supply 5, the electric double layer capacitors 2 each has a stored energy density which is only about $\frac{1}{100}$ of the density available with the secondary battery. Therefore, energy stored in the capacitors 2 makes little contribution to the total stored energy.

Figure 6:
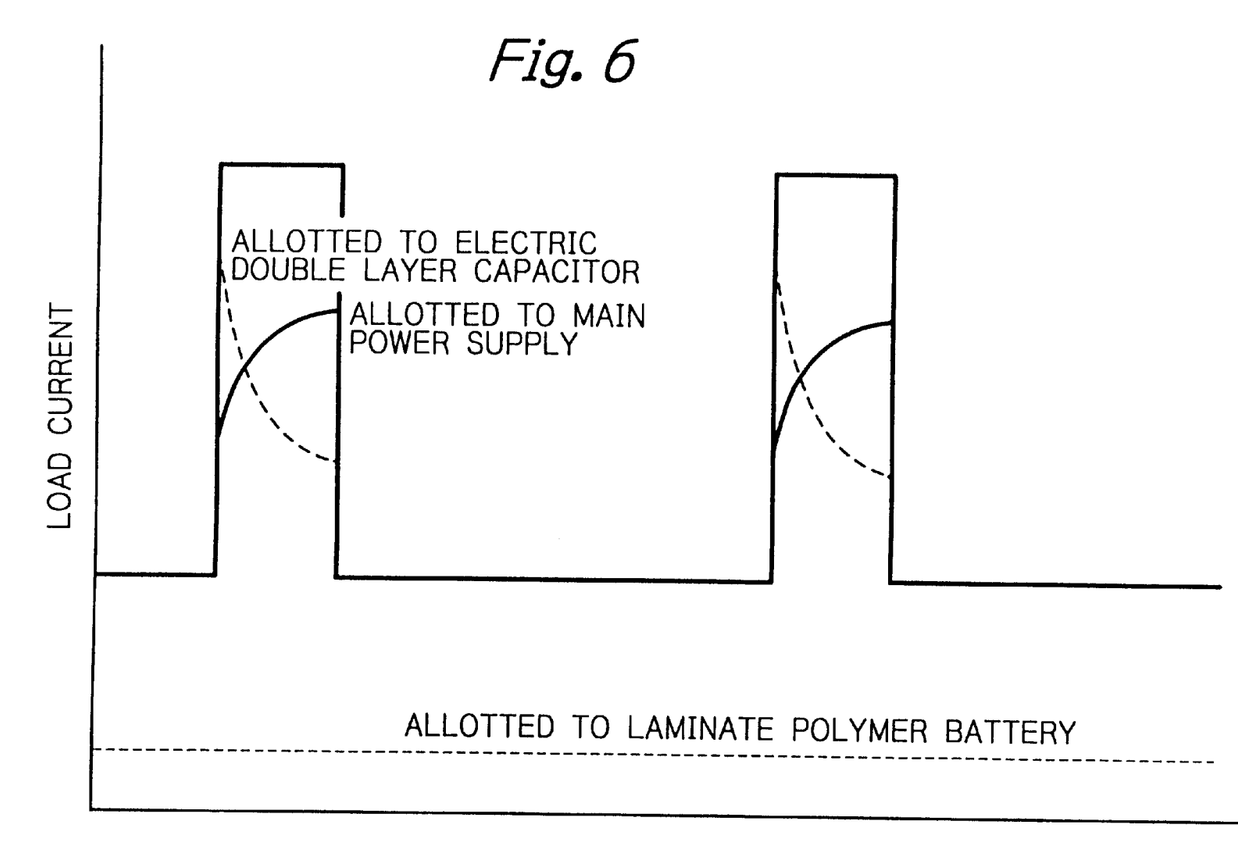
FIG. 6 shows load allotment achievable with the embodiment of FIG. 5.

Assume electronic equipment including the pulse generating device 3 as a device needing a rapid current load, a DRAM as the low voltage IC 7, and a lithium secondary battery as the main power supply 5. FIG. 6 shows a relation between the variation of the load current of such equipment with respect to time and the load allotment to the capacitor 2, battery 4, and main power supply or lithium ion battery 5. When a pulse current is applied, the capacitor 2 and lithium ion battery (main power supply 5) divide the load between them. As a result, the lithium ion battery feeds a smaller current than when it is used alone. This successfully reduces a voltage drop ascribable to an internal impedance and thereby extends the time when the battery reaches its end voltage. For the DRAM or constant load source, the battery 4 feeds a current via the short feed line 8, so that the feed line 8 is prevented from conveying noise.

Figure 7:
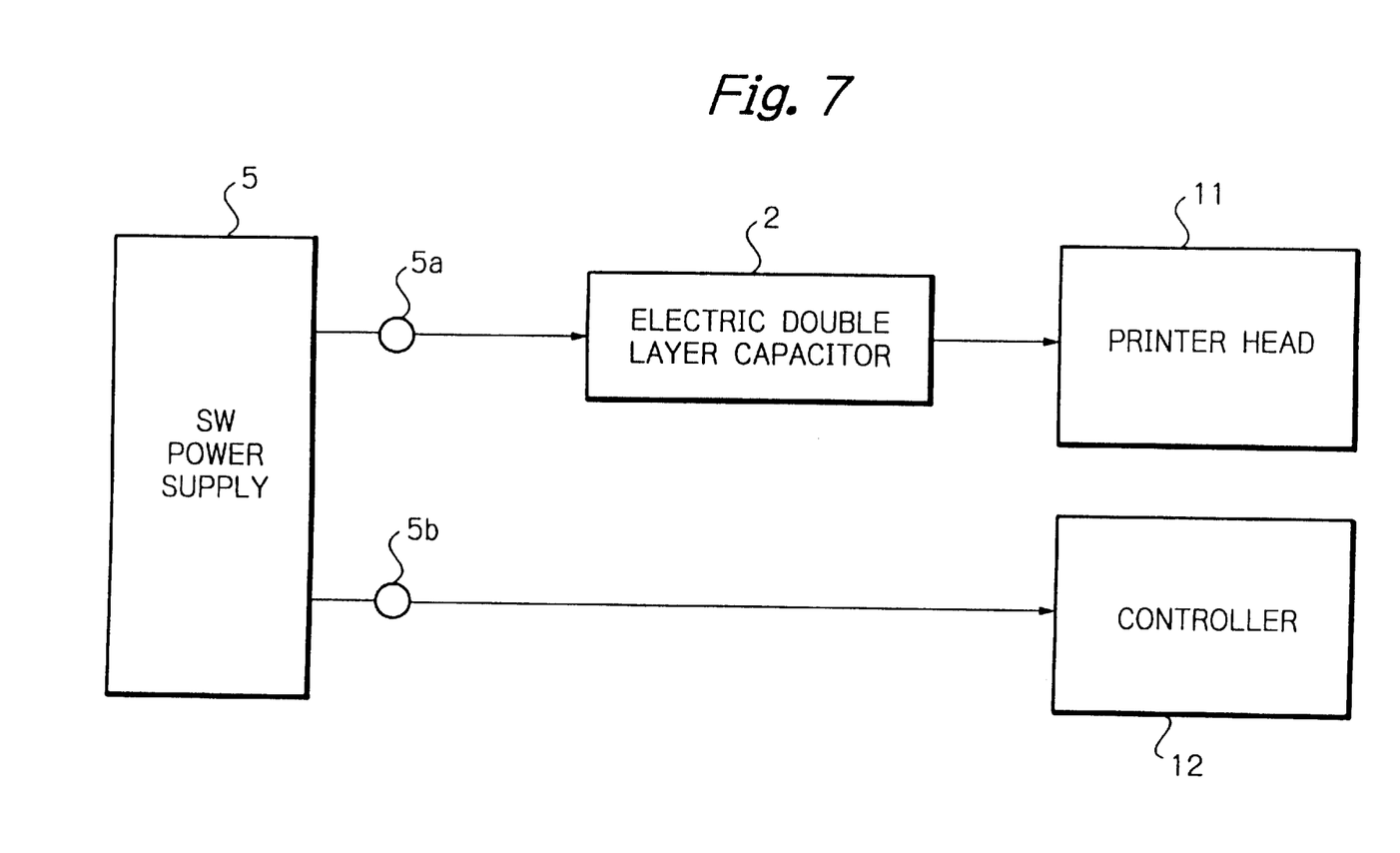
FIGS. 7, 8 and 9 are schematic block diagrams each showing a particular alternative embodiment of the present invention.

Referring to FIG. 7, a power supply circuit embodying the present invention will be described. As shown, a SW power supply 5 includes a 24 V to 40 V output terminal 5a and a 5 V output terminal 5b and has a capacity of 50 V. The output terminal 5a is connected to a printer head 11 via a 4F/40v electric double layer capacitor 2. The printer head 11 is driven by a motor, not shown. The output terminal 5b is connected to a controller 12.

To cause the printer head 11 to start operating, a current of 40 V and 2 A, i.e., 80 W must be fed, as measured between the opposite terminals of the electric double layer capacitor 2. It will be seen that about 60% of the above current is available with a current output from the capacitor 2. That is, the capacitor 2 and SW power supply 5 respectively bear 48 W and 32 W at the time when the printer head 11 begins to operate. Should the capacitor 2 be absent, the SW power supply 5 should bear 80 W alone and would need a capacity of 80 W. However, so long as the load increases only for a moment, the load on the main power supply 5 can be noticeably reduced if the capacitor 2 bears a part of the load. When the capacitor 2 is fully discharged, it is immediately charged by the SW power supply 5 and prepared for the next discharge thereby. In this manner, by causing the capacitor 2 to feed power in the event of momentary increase in required power, it is possible to reduce the capacity required of the SW power supply 5 and therefore to miniaturize the power supply circuit. A miniature power supply circuit is successful to reduce the size and cost of the entire equipment.

Figure 8:
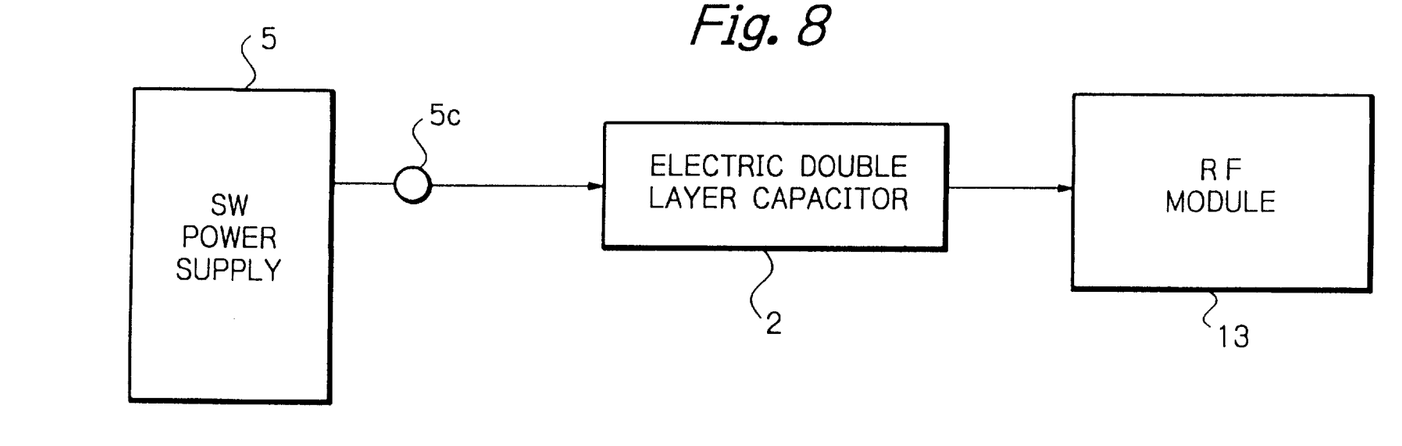

Reference will be made to FIG. 8 for describing an alternative embodiment of the present invention. As shown, an RF (Radio Frequency) module 13 is connected to the output terminal of a lithium secondary battery or main power supply 5. The RF module 13 is used to drive a modem. The secondary battery 5 has an electromotive force of 4.2 V, an energy density of 600 mWh, an internal impedance of 300 mΩ, and an end voltage of 3.2 V. An electric double layer capacitor 2 is connected between the secondary battery 5 and the RF module 13 and has a capacity of 1 F and an internal impedance of 150 mΩ. How the secondary battery 5 and capacitor 2 divide the current load therebetween at the time of start of oscillation drive of the RF module 134 was determined in terms of currents to flow between the opposite terminals of the battery 5 and those of the capacitor 2. The measurement showed that 2A and 4 A of total 6 A which was a peak voltage required of the RF module 13 were respectively discharged from the secondary battery 5 and capacitor 2. For example, the current allocated to the capacitor 2 is expressed as:

$$I(w)=I(sum) \times R(Li)/[R(Li)+R(w)]$$

where I and R respectively denote a current and an impedance, and parenthesized w, Li and sum respectively denote the capacitor 2, the battery 5, and a sum.

The terminal voltage of the secondary battery 5 varies with the elapse of time, as follows. When the RF module 13 starts oscillating pulses, the terminal voltage drops immediately due to the internal impedance of the battery 5. The lowered voltage is not recovered raised until the RF module 13 stops oscillating. In the illustrative embodiment, the voltage drop ascribable to the internal impedance is produced by:

$$2(A) \times 300 \ (m\Omega)=0.6 \ V$$

The above voltage drop is far smaller than a voltage drop measured in the absence of the capacitor 2 and expressed as:

$$6(A) \times 300 \ (m\Omega)=1.8 \ V$$

As stated above, the allotment of the load to the capacitor 2 and secondary battery 5 is successful to reduce the voltage drop ascribable to the internal impedance of the battery 5. Consequently, the time when the battery 5 reaches its end voltage is extended.

Figure 9:
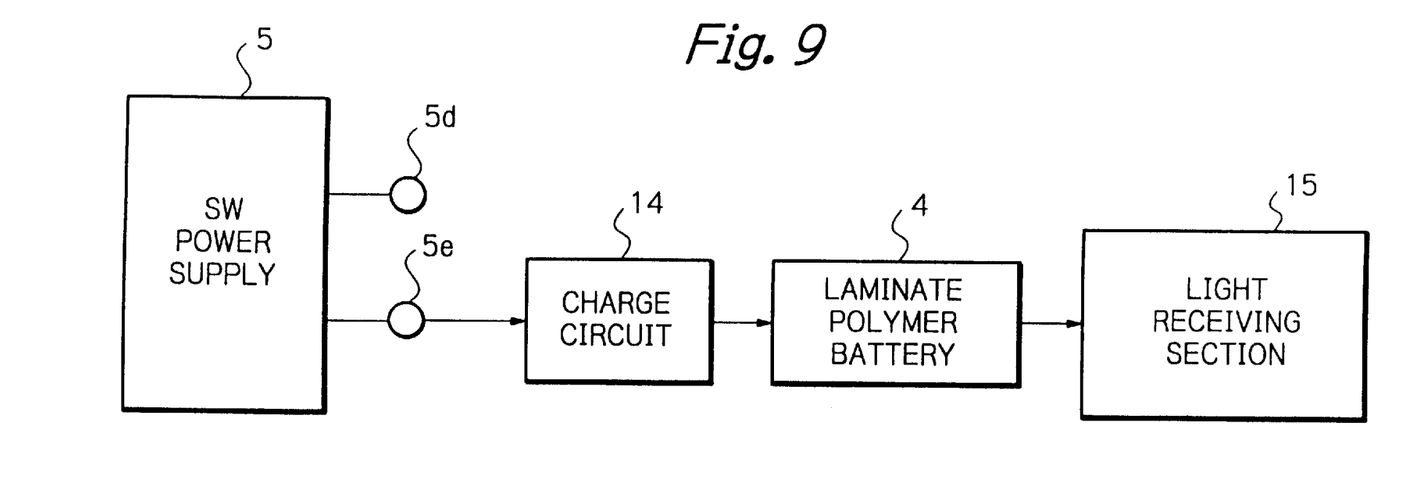

FIG. 9 shows another alternative embodiment of the present invention. As shown, a SW power supply 5 includes a 40 V to 80 V output terminal 5$d$ and a 5 V output terminal 5$e$. The output terminal 5$e$ is connected to a light receiving section 15 via a charge circuit 14 and a laminate polymer battery 4. The light receiving section 15 is included in, e.g., a TV receiver and receives, e.g., an infrared signal from a remote controller, not shown, while the receiver is in a stand-by state. The light receiving section 15 constantly receives power from a main power supply even when, e.g., a TV receiver is not used, so that the receiver can be turned on from a remote controller. While a SW power supply can have its capacity varied to about 10% of the maximum capacity, the light receiving section 15 needs only a small amount of power. FIG. 3 shows a curve representative of the power supply efficiency of the SW power supply 5.

Assume that the required power is 0.3 W, and that the minimum variable power of the SW power supply 5 is 8 W, as in the illustrative embodiment. Then, power of 7.7 W (8−0.3=7.7) is simply wasted as thermal energy. If the light receiving section 15 is powered by the laminate polymer battery 4, then the wasteful energy loss can be obviated. In this embodiment, it is not desirable to replace the laminate polymer battery with another kind of secondary battery from the cycle life standpoint. Specifically, assume that a TV receiver for home use is turned on and turned off at least twice a day. Then, the receiver is repeatedly charged and discharged at least about 2,400 times in three years. Secondary batteries other than the laminate polymer battery cannot withstand such a number of times of charging and discharging.

In summary, it will be seen that the present invention provides a power supply circuit having various unprecedented advantages, as enumerated below.

(1) An electric double layer capacitor copes with a momentary great current and allows a power supply to be designed only for a constant output. The circuit therefore reduces a capacity required of a power supply and thereby reduces the size and cost of the entire equipment in which the circuit is included.

(2) The electric double layer capacitor having a great capacity bear part of a pulse current so as to reduce a voltage drop ascribable to the internal resistance of a battery. This successfully extends the life of the battery when loaded in equipment of the kind outputting pulses continuously.

(3) The supply of a required current of low level is allocated to a laminate polymer battery, so that the energy efficiency of the power supply is prevented from being lowered by the above required current.

(4) The laminate polymer battery is positioned in the vicinity of a circuit device and connected to the circuit device by a short feed line. This obviates malfunction ascribable to noise particular to a device driven by a low voltage.

Various modifications will become possible for those skilled in the art after receiving the teachings of the present disclosure without departing from the scope thereof.

What is claimed is:

1. A power supply circuit, comprising:
   a main power supply;
   a first auxiliary power supply which supplies power to a first circuit having first load requirements that result when a change in load of said first circuit occurs; and
   a second auxiliary power supply which supplies power to a second circuit having second load requirements, said second load requirements being less than said first load requirements,
   wherein said first auxiliary power supply includes an electric double layer capacitor connected in parallel with said main power supply, said electric double layer capacitor dividing a current load of said first circuit between said electric double layer capacitor and said main power supply, and wherein said second auxiliary power supply is connected to said main power supply and includes a battery having one of a positive pole and a negative pole formed of a conductive polymer.

2. A power supply circuit as claimed in claim 1, wherein the conductive polymer of said battery comprises a positive pole or a negative pole active substance selected from the group consisting of polypyrol, polyaniline, and polythiophene.

3. A power supply circuit as claimed in claim 1, wherein as a result of said electric double layer capacitor dividing the current load of said first circuit between said electric double layer capacitor and said main power supply, maximum capacity requirements of said main power supply are reduced by an amount sufficient to reduce a size of said power supply circuit.

4. A power supply circuit as claimed in claim 1, wherein said main power supply has a minimum output power capacity substantially greater than the second load requirements of said second circuit, said polymer battery supplying power to said second circuit so that energy of said main power supply is not dissipated as a result of a disparity between the minimum output power capacity of said main power supply and the second load requirements of said second circuit.

5. A power supply circuit as claimed in claim 1, wherein said electric double layer capacitor supplies power to said first circuit while said main power supply charges said electric double layer capacitor.

6. A power supply circuit as claimed in claim 1, wherein said second auxiliary power supply is connected to said second circuit by a feed line of a length sufficient to reduce noise from propagating from the second circuit.

7. A power supply circuit as claimed in claim 1, wherein the main power supply directly supplies power to at least a third circuit having third load requirements different from said first and second load requirements.

8. A power supply circuit comprising:
   a main power supply;
   an auxiliary power supply; and
   a plurality of loads connected in parallel to said main power supply,
   wherein at least one of said plurality of loads rapidly varies,
   wherein said auxiliary power supply comprises a plurality of auxiliary power supplies connected in parallel to said main power supply and each being assigned to a particular load, and
   wherein said main power supply and said plurality of auxiliary power supplies each take over a portion of a varying load current.

9. A power supply circuit as claimed in claim 8, wherein first one of said auxiliary power supplies supplies power to a first circuit having first load requirements that result when a change in load of said first circuit occurs, and
   wherein a second one of said auxiliary power supplies supplies power to a second circuit having second load requirements, said second load requirements being less than said first load requirements.

10. A power supply circuit as claimed in claim 9, wherein said first auxiliary power supply includes an electric double layer capacitor connected in parallel with said main power supply, said electric double layer capacitor dividing a current load of said first circuit between said electric double layer capacitor and said main power supply, and
   wherein said second auxiliary power supply is connected to said main power supply and includes a battery having one of a positive pole and a negative pole formed of a conductive polymer.

11. A handy electronic apparatus, comprising:
   a plurality of loads; and
   a power supply circuit which includes:
      (a) a main power supply, and
      (b) an auxiliary power supply, said plurality of loads connected in parallel to said main power supply,
   wherein at least one of said plurality of loads rapidly varies,
   wherein said auxiliary power supply comprises a plurality of auxiliary power supplies connected in parallel to said main power supply and each being assigned to a particular load, and
   wherein said main power supply and said plurality of auxiliary power supplies each take over a portion of a varying load current.

* * * * *